United States Patent
Terekhov

(10) Patent No.: US 11,113,820 B2
(45) Date of Patent: Sep. 7, 2021

(54) METHOD OF LINE DETECTION

(71) Applicant: Apical Limited, Cambridge (GB)

(72) Inventor: Vladislav Terekhov, Loughborough (GB)

(73) Assignee: Apical Limited, Cambridge (GB)

( * ) Notice: Subject to any disclaimer, the term of this patent is extended or adjusted under 35 U.S.C. 154(b) by 46 days.

(21) Appl. No.: 16/279,748

(22) Filed: Feb. 19, 2019

(65) Prior Publication Data

US 2019/0180444 A1    Jun. 13, 2019

Related U.S. Application Data

(63) Continuation of application No. PCT/GB2017/052259, filed on Aug. 3, 2017.

(30) Foreign Application Priority Data

Aug. 19, 2016 (GB) .................................. 1614234

(51) Int. Cl.
*G06K 9/00* (2006.01)
*G06T 7/13* (2017.01)
*G06T 7/181* (2017.01)
*G06K 9/46* (2006.01)
*G06K 9/62* (2006.01)

(52) U.S. Cl.
CPC .............. *G06T 7/13* (2017.01); *G06K 9/4604* (2013.01); *G06K 9/6215* (2013.01); *G06T 7/181* (2017.01)

(58) Field of Classification Search
CPC .......... G06K 9/4638; G06T 7/13; G06T 7/181
See application file for complete search history.

(56) References Cited

U.S. PATENT DOCUMENTS

| 9,317,766 | B2* | 4/2016 | Zheng ..................... G06T 7/13 |
| 9,395,192 | B1 | 7/2016 | Silver et al. |
| 9,406,138 | B1* | 8/2016 | St-Pierre .................. G06T 7/13 |
| 2008/0193029 | A1* | 8/2008 | Kamata ................ G06K 9/4647 382/249 |
| 2008/0199082 | A1* | 8/2008 | Tanaka ................. G06K 9/4604 382/199 |

(Continued)

FOREIGN PATENT DOCUMENTS

| JP | H04153889 A | 5/1992 |
| WO | 2016059643 A1 | 4/2016 |

OTHER PUBLICATIONS

United Kingdom search report dated Feb. 1, 2017 for GB Application No. GB1614234.1.

(Continued)

*Primary Examiner* — Avinash Yentrapati
(74) *Attorney, Agent, or Firm* — EIP US LLP

(57) ABSTRACT

Certain examples described herein relate to a method for detecting a line in an image. In one such example, the method comprises identifying a candidate line break region in the image. Identifying the candidate line break region comprises identifying a first pixel of the image and a second pixel of the image, between which the candidate line break region appears, a characteristic of the first pixel and the second pixel having a predetermined similarity relationship. The method then comprises using the identified candidate line break region to assist in detecting a line in the image.

15 Claims, 8 Drawing Sheets

(56) References Cited

U.S. PATENT DOCUMENTS

| | | | |
|---|---|---|---|
| 2010/0239165 A1* | 9/2010 | Wu | G06K 9/2054 |
| | | | 382/176 |
| 2010/0329513 A1* | 12/2010 | Klefenz | G06K 9/00805 |
| | | | 382/104 |
| 2011/0299784 A1 | 12/2011 | Katti et al. | |
| 2012/0134563 A1* | 5/2012 | Nakano | G06T 7/0012 |
| | | | 382/131 |
| 2015/0161473 A1* | 6/2015 | Zheng | G06T 7/13 |
| | | | 382/202 |
| 2016/0300338 A1* | 10/2016 | Zafar | G06K 9/6201 |

OTHER PUBLICATIONS

International search report dated Nov. 24, 2017 for PCT Application No. PCT/GB2017/052259.

\* cited by examiner

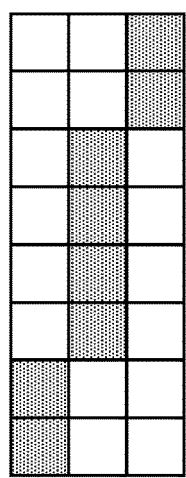
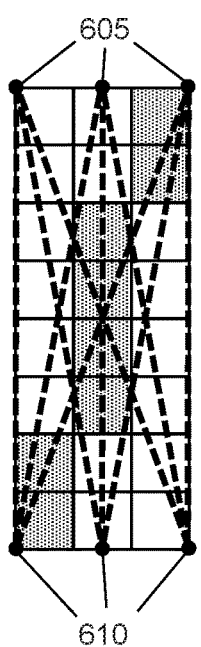
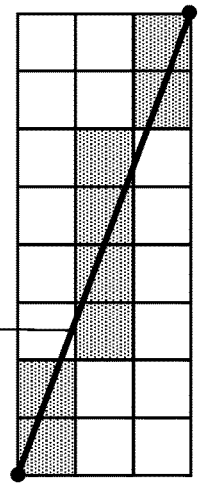
*Fig. 6a*  *Fig. 6b*  *Fig. 6c*

METHOD OF LINE DETECTION

CROSS-REFERENCE TO RELATED APPLICATIONS

This application is a continuation of International Application No. PCT/GB2017/052259, filed Aug. 3, 2017, which claims priority to UK patent application no. 1614234.1, filed Aug. 19, 2016, under 35 U.S.C. § 119(a). Each of the above-referenced patent applications is incorporated by reference in its entirety.

BACKGROUND OF THE INVENTION

Technical Field

The present invention relates to methods, apparatus and computer programs for detecting a line in an image.

Background

It is frequently desirable to detect lines, or edges, in digital images. Such lines may for example represent edges of objects, or shapes of features on the surface of objects. Lines may be detected algorithmically using a line detection algorithm which, when applied to an image, outputs a set of detected lines.

SUMMARY

According to a first aspect of the present invention, there is provided a method for detecting a line in an image. The method comprises identifying a candidate line break region in the image, wherein identifying the candidate line break region comprises identifying a first pixel of the image and a second pixel of the image, between which the candidate line break region appears, a characteristic of the first pixel and the second pixel having a predetermined similarity relationship.

The method then comprises using the identified candidate line break region to assist in detecting a line in the image.

The characteristic may be gradient angle.

In an example, the candidate line break region comprises a pixel with a predetermined difference relationship to the first and second pixels.

The predetermined difference relationship of the pixel of the candidate line break region to the first and second pixels may such that the pixel of the candidate line break region has a gradient amplitude lower than a gradient amplitude of the first pixel and lower than a gradient amplitude of the second pixel.

Alternatively or additionally, the predetermined difference relationship of the pixel of the candidate line break region to the first and second pixels may be such that the pixel of the candidate line break region has a gradient angle different from a or the gradient angle of the first pixel and different from a or the gradient angle of the second pixel.

In an embodiment, the predetermined similarity relationship is such that the characteristic of the second pixel is within a predefined range of the characteristic of the first pixel.

The method may comprise identifying that the candidate line break region has a predetermined size characteristic.

In a further example, the method comprises: assigning to a or the pixel of the candidate line break region a gradient amplitude based on at least one of a or the gradient amplitude of the first pixel and a or the gradient amplitude of the second pixel; and assigning to a or the pixel of the candidate line break region a gradient angle based on at least one of a or the gradient angle of the first pixel and a or the gradient angle of the second pixel, wherein the detecting of the line in the image is based on the assigned gradient amplitude and the assigned gradient amplitude.

The method may further comprise filtering a or the gradient amplitude of at least one pixel, wherein the filtering comprises determining whether adjacent pixels have a predefined gradient amplitude relationship.

In one embodiment, the method comprises identifying a line component in the image, wherein identifying the line component comprises: identifying a contiguous region comprising a plurality of pixels and corresponding to the line component; and determining a best-fit line component through the contiguous region, wherein: the pixels of the plurality have a predetermined gradient amplitude characteristic; the pixels of the plurality have a predetermined gradient angle characteristic; and the contiguous region has a predetermined size characteristic.

Determining the best-fit line component may comprise: if the contiguous region has a first predefined width characteristic and a first predefined height characteristic, wherein the height is greater than the width: determining an error corresponding to each of a predetermined number of candidate line components through the contiguous region, wherein end points of each candidate line component lie at predefined positions associated with the top edge and bottom edge of the contiguous region; and identifying as the best-fit line component the candidate line component with lowest corresponding error; if the contiguous region has a second predefined width characteristic and a second predefined height characteristic, wherein the width is greater than the height: determining an error corresponding to each of a predefined number of candidate line components through the contiguous region, wherein end points of each candidate line component lie at predefined positions associated with the left-hand edge and right-hand edge of the contiguous region; and identifying as the best-fit line component the candidate line component with lowest corresponding error, and if the first contiguous region does not have the first predefined width characteristic and first predefined height characteristic, and does not have the second predefined width characteristic and second predefined height characteristic: determining the best-fit line component based on a regression analysis of the contiguous region.

In some examples, the number of predefined positions depends on the lesser of the height and width of the contiguous region.

The method may comprise identifying the line in the image as comprising the line component.

According to aspects of the present disclosure, there is provided an apparatus for detecting a line in an image. The apparatus comprises: an input configured to receive an image; a processor configured to: determine a gradient amplitude and a gradient angle for each of a plurality of pixels of the image; identify a candidate line break region in the image, wherein identifying the candidate line break region comprises identifying a first pixel of the plurality and a second pixel of the plurality, between which the candidate line break region appears, wherein: the first pixel has a first quantised gradient angle and the second pixel has a second quantised gradient equal to the first gradient angle; the first pixel and second pixel each have a predefined gradient amplitude characteristic; and the pixel or pixels of the candidate line break region do not have the predefined amplitude characteristic, and identify a line in the image, wherein the line passes through the candidate line break region.

According to a further aspect, there is provided a non-transitory computer-readable storage medium comprising a set of computer-readable instructions stored thereon which, when executed by at least one processor, cause the at least one processor to: receive from an input an image; and identify a candidate line break region in the image, wherein identifying the candidate line break region comprises identifying a first pixel of the image and a second pixel of the image, between which the line break candidate appears, wherein: the first pixel has a first gradient angle and the second pixel has a second gradient angle with a predetermined relationship to the first gradient angle; assign to each pixel of the candidate line break region a gradient amplitude based on at least one of a gradient amplitude of the first pixel and a gradient amplitude of the second pixel; assign to each pixel of the candidate line break region a gradient angle based on at least one of the first gradient angle and the second gradient angle; and based on the assigned gradient angle and assigned gradient amplitude, detecting a line in the image.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 6a to 6c show an example contiguous region of an image through which a candidate line component may be identified;

DETAILED DESCRIPTION

Figure 1:
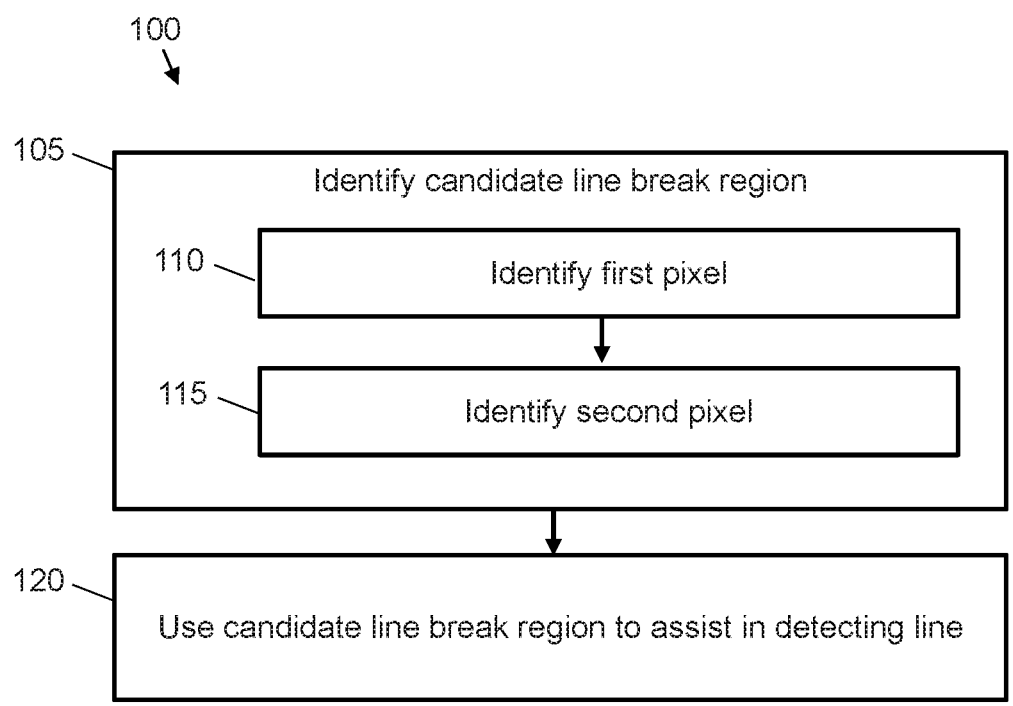
FIG. 1 shows a flow diagram of a method for detecting a line in an image according to an embodiment.

FIG. 1 shows a flow diagram of a method 100 for detecting a line in an image according to an embodiment. The image may for example comprise a still image, or a frame of a video. The method comprises an identifying step 105 in which a candidate line break region is identified in the image. Identifying the candidate line break region comprises a step 110 of identifying a first pixel of the image and a step 115 of identifying a second pixel of the image, between which the candidate line break region appears. In the present disclosure, a "pixel" is a subdivision of the image. It may be a single element of the image or, alternatively, a group of elements such as a 4×4 square.

Following identification of the candidate line break region, the method 100 comprises a step 120 of using the candidate line break region to assist in detecting a line in the image, as will be described in more detail below. The method thus allows for detection of a single line where other methods would erroneously detect more than one separate line.

Figure 2:
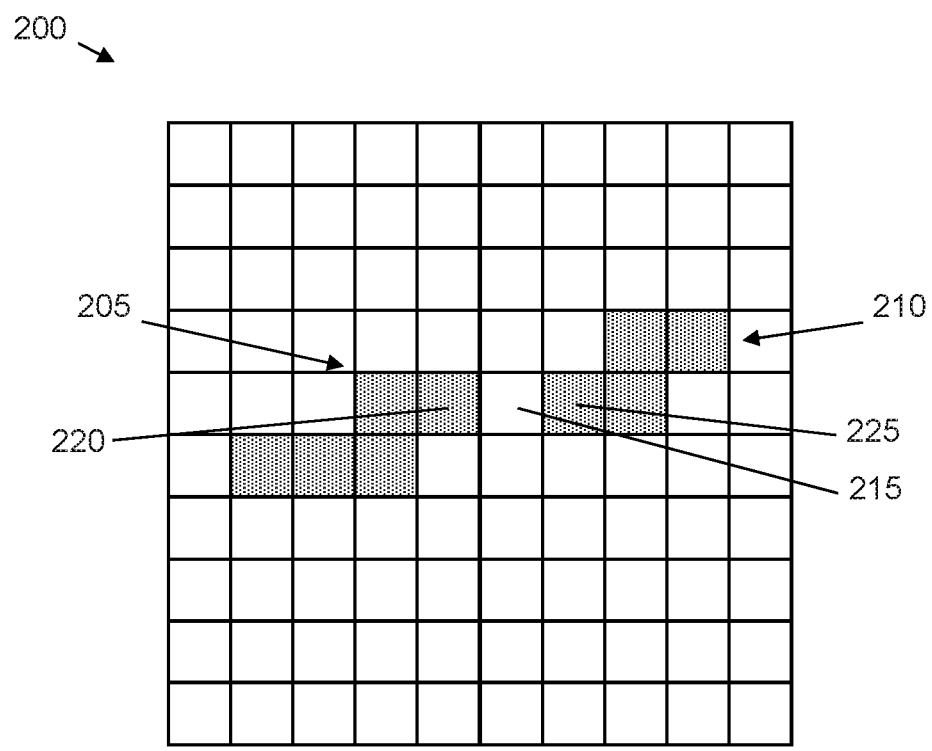
FIG. 2 shows an example image comprising a candidate line break region.

FIG. 2 shows an image 200 comprising two regions of pixels 205, 210, separated by a pixel 215. Known image detection algorithms may detect the regions 205, 210 as separate lines. The present method may identify pixel 220 as the first pixel and pixel 225 as the second pixel, and thus identify pixel 215 as the candidate line break region.

Figure 3:
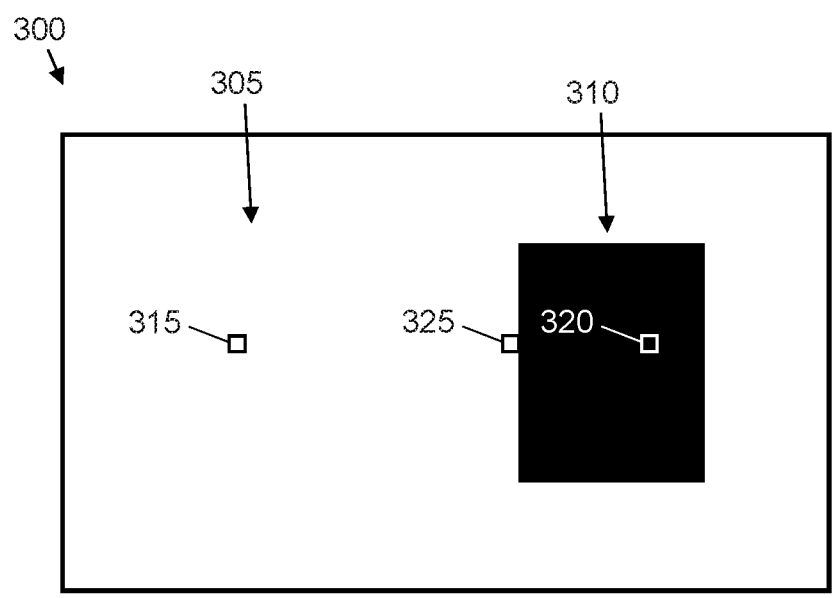
FIG. 3 shows an example image comprising light and dark regions.

FIG. 3 shows an image 300 comprising a uniform light region 305 and a uniform dark region 310. A gradient amplitude and/or angle may be associated with pixels of the image. These may be determined using a Sobel filter, which produces a gradient amplitude and gradient angle for each pixel. These values may be stored as a gradient amplitude matrix, or bitmap, and a gradient angle matrix, or bitmap, representing the gradient amplitude and gradient angle, respectively, of each pixel. In embodiments, one or each of these bitmaps are updated by having new values assigned as described below. The bitmap or bitmaps are thus enhanced for the purposes of line detection.

As an example of gradient amplitude and angle, a pixel 315 in the middle of the uniform light region 305 would have a gradient amplitude of zero, as would a pixel 320 in the middle of the uniform dark region 310. A pixel 325 at the boundary of the light region 305 and dark region 310 would have a high gradient amplitude, and would have a gradient angle perpendicular to the border between the light region 305 and dark region 310.

Returning to FIG. 1, in the method 100 a characteristic of the first and second pixels has a predetermined similarity relationship. The characteristic may for example be gradient angle. For example, the predetermined relationship may be such that the characteristic of the first pixel is equal to the characteristic of the second pixel, or that the characteristic of the second pixel is within a predefined range of the characteristic of the first pixel.

Figure 4:
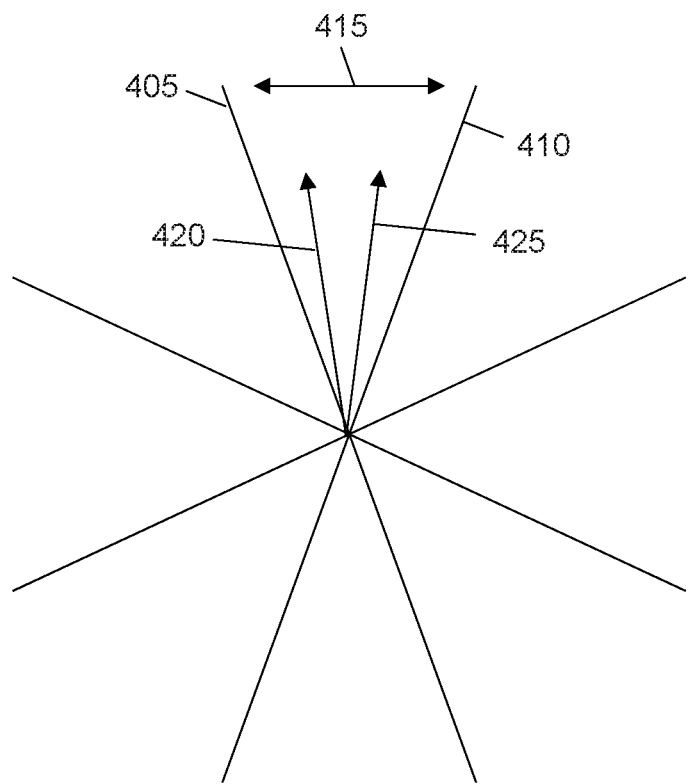
FIG. 4 shows an example scheme for quantising gradient angles.

In one example, the first and second gradient angles are quantised gradient angles. FIG. 4 shows an example scheme for quantising gradient angles. A full range of 360° is divided into angular ranges, such as the angular range 405 defined by angles 410 and 415. In this example, the range 405 is centred on the vertical. Pixels with gradient angle within the range 415 are assigned the same quantised gradient angle which, in this example, is a vertical. For example, angles 420 and 425 both lie within the range 415 and thus correspond to the same quantised angle. The angular ranges may be the same size, as shown, or may differ in size. The number of angular ranges into which to divide the full 360° may be selected based on a trade-off of processing efficiency and accuracy of line detection results. For example, increasing the number of angular ranges would typically provide more accurate line detection results, but would be less computationally efficient. In examples in which the first and second angles are quantised gradient angles, the predetermined relationship of the second gradient angle to the first gradient angle may be that the second gradient angle is equal to the first gradient angle.

Returning to FIG. 1, at block 120 the identified candidate line break region is used to assist in detecting a line in the image. For example, where two detected lines such as 205 and 210 in FIG. 2 are separated by the candidate line break region, such as pixel 215 as shown in FIG. 2, it may be determined that the two lines 205, 210 should be combined into a single line running through the candidate line break region 215. Various known methods of line detection, as described below, may be used. Line detection may be repeatedly performed on the image, whereby to detect multiple lines present in the image. The detected lines may be used as an input to many known image processing techniques, for example pattern recognition and/or object classification.

In some examples, the candidate line break region comprises a pixel identified to have a predetermined difference relationship to the first and second pixels. For example, the predetermined relationship may be such that the pixel of the candidate line break region is identified to have a gradient amplitude lower than a gradient amplitude of the first pixel and/or lower than a gradient amplitude of the second pixel. This may be achieved by requiring the first and second pixels to have gradient amplitude above a predefined threshold, and requiring the pixel or pixels of the candidate line break region to have gradient amplitude below the predefined threshold.

Alternatively or additionally, the predetermined difference relationship may be such that the pixel or pixels of the candidate line break region have gradient angles different from the gradient angle of the first pixel and different from the gradient angle of the second pixel.

In some examples, the candidate line break region has a predetermined size characteristic. For example, this characteristic may be that the candidate line break region has length equal to or less than a threshold. This threshold may be expressed as a number of pixels. For example, the line break may have length equal to a single pixel.

The method may comprise assigning to a pixel of the candidate line break region a gradient amplitude which is different to the original gradient amplitude of the pixel in the candidate line break region. This may be stored in the gradient amplitude bitmap, to generate an enhanced gradient amplitude bitmap. For example, with reference to FIG. 2, the pixel 215 of the candidate line break region may be assigned a gradient amplitude based on at least one of the gradient amplitude of the first pixel 220 and the gradient amplitude of the second pixel 225. For example, the pixel 215 of the candidate line break region may be assigned a gradient amplitude equal to the gradient amplitude of the first pixel 220 or the second pixel 225. As another example, the pixel 215 of the candidate line break region may be assigned a gradient amplitude equal to an average of the gradient amplitude of the first pixel 220 and the gradient amplitude of the second pixel 225. The detecting of the line in the image may then be based on the assigned gradient amplitude.

Alternatively or additionally, the method may comprise assigning to a pixel of the candidate line break region, for example pixel 215 of FIG. 2, a gradient angle based on at least one of the gradient angle of the first pixel 220 and the gradient angle of the second pixel 225. This may be stored in the gradient angle bitmap, to generate an enhanced gradient angle bitmap. For example, the pixel 215 of the candidate line break region may be assigned a gradient angle equal to the gradient angle of the first pixel 220 and/or equal to the gradient angle of the second pixel 225. As another example, the pixel 215 or pixels of the candidate line break region may be assigned a gradient angle equal to an average of the gradient angle of the first pixel 220 and the gradient angle of the second pixel 225.

Throughout the present disclosure where values, for example gradient amplitudes and gradient angles, are assigned to pixels, the assigned value may be stored in a shadow image instead of immediately changing the value of the pixel in the image. This allows each pixel of the image to be analysed in turn without the analysis being influenced by changes in values of surrounding pixels, and thus improves the accuracy of the analysis whilst requiring additional computing resources. After each assigned value is stored in the shadow image, the assigned values may then be copied back to the main image.

In some examples, the method comprises filtering the edge gradient of at least one pixel of the image, wherein the filtering comprises determining whether adjacent pixels have a predefined gradient amplitude relationship. For example, the filtering may comprise comparing in turn the gradient amplitude of each pixel of the image with the gradient amplitude of surrounding pixels, and modifying the gradient of a given pixel as a result of this comparison. As such, the filtering may be based on local feature analysis. In one example, the filtering comprises determining the differences between the gradient amplitude of a given pixel and the gradients of each surrounding pixel. The maximum of these gradient differences is then compared with a predefined threshold and, if the maximum gradient difference is below the threshold, the given pixel is assigned a gradient amplitude of zero. In this manner, areas of the image with low gradient amplitude, i.e. comparatively flat areas of the image, may be assumed to not comprise edges or lines and may thus be excluded from at least some further processing. This improves the computational efficiency of the method. The filtering step may be performed before determining candidate line break regions, such that the determining of candidate line break regions is based on the output of the filtering.

Figure 5:
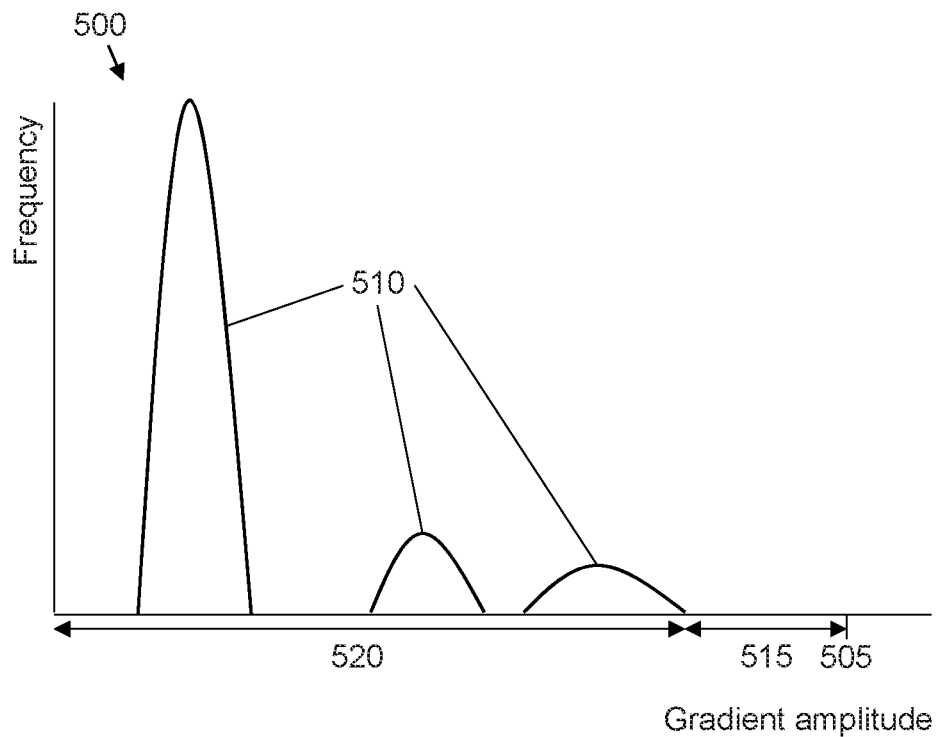
FIG. 5 shows a schematic representation of a histogram of gradient amplitude in an image.

In some examples wherein filtering is performed based on a predefined threshold, as described above, the predefined threshold may be a fixed value. In other such examples, the threshold may be determined based on an analysis of gradient amplitudes in the image, as will now be described with reference to FIG. 5. A histogram 500 may be produced representing the frequency of occurrence of gradient amplitudes of pixels in the image, wherein gradient amplitudes range from zero to a maximum 505. For example, in an 8-bit image, the maximum gradient amplitude may be 255. Typically, the distribution of gradient amplitudes comprises peaks 510, and it is frequently the case that no pixels have gradient amplitude in a range 515 terminating at the maximum gradient amplitude 505. The presence and width of the range 515 depends on the specific image undergoing analysis. As such, all pixels of the image have gradient amplitudes within a range 520 from zero up to the highest gradient amplitude in the image, i.e. the lower limit of range 515.

In one example, the predefined amplitude threshold is set equal to the product of a constant value and an average, for example the mean, of pixel values over the range 520. For example, the average may be determined as:

$$\text{average} = \frac{\sum_{i=0}^{k} a(i)}{n}$$

where a(i) is the cumulative frequency of the gradient amplitude, k is the size of the histogram and n is the number of nodes, or bins, of the histogram over the range 520. The constant value varies according to the number of pixels surrounding a given pixel during the filtering procedure, and may be determined empirically based on analysis of a large number of images. For example, where the filtering procedure considers all the pixels in a 3×3 or 5×5 square surrounding the given pixel, the constant value may advantageously be between 1.8 and 2.4.

In some examples the method comprises, following the above-described filtering, identifying pixels with non-zero gradient surrounded by pixels with zero gradient and assigning a gradient of zero to these pixels. In this manner, lone pixels with non-zero gradient that do not form part of a potential line may be excluded from further processing. This increases computational efficiency. Computational efficiency may be further increased by identifying small isolated regions of pixels with non-zero gradient amplitude surrounded by pixels with zero gradient amplitude. For example, regions of connected pixels smaller than a 2×2 square may be identified, and their gradient amplitudes set to zero. These steps do not significantly reduce the quality of the line detection, as such small isolated pixels and/or regions are not likely to form part of lines.

In some examples the detecting 120 the line comprises performing a connected components analysis to identify regions of the image corresponding to respective line segments. For example, identifying such a region may comprise identifying a contiguous region comprising a plurality of pixels with given gradient characteristics. One example of such a characteristic is a gradient amplitude above a predefined threshold, for example the previously-defined amplitude threshold. Alternatively, where the above-described filtering is performed, one example of such a characteristic is a non-zero gradient amplitude. Another example of such a characteristic is a gradient angle equal to, or within a predefined range of, other pixels of the contiguous region. The contiguous region may have a predetermined size characteristic. For example, the contiguous region may have length and/or width above a predefined threshold. Contiguous regions with size below a size threshold may be ignored in further analysis to improve computational efficiency. The size threshold may be optimised based on a trade-off between memory requirements and accuracy of line detection.

FIG. 6a shows an example 600 of such a contiguous region comprising pixels satisfying the gradient characteristics (shaded) and pixels not satisfying the gradient characteristics (not shaded). The method then comprises determining a best-fit line component through the contiguous region 600. The best-fit line component may be determined using a random sample consensus algorithm.

In one example, determining the best fit line component comprises determining whether the contiguous region 600 has a first predefined width characteristic and a first predefined height characteristic, wherein the height is greater than the width. For example, this may require the height to be greater than a long-edge threshold and require the width to be less than the short-edge threshold, such that the region 600 is comparatively tall and thin, as shown in FIG. 6a. Referring to FIG. 6b, if the region 600 has these characteristics, the present example comprises determining an error corresponding to each of a predetermined number of candidate line components (dashed lines) through the region 600. End points of each candidate line component lie at predefined positions 605 associated with the top edge, and at predefined positions 610 associated with the bottom edge of the region 600. For example, predefined positions 605 may be equally spaced along the top of the region 600, and predefined positions 610 may be equally spaced along the bottom of the region 600. Increasing the number of predefined positions produces more accurate results, but requires increased computational resources. As such, the number of predefined positions may be optimised based on a trade-off between desired accuracy and available processing resources. The method then comprises identifying as the best-fit line component the candidate line component with lowest corresponding error. For example, the error corresponding to a given candidate line component may be determined based on the distance of the centre point of each shaded pixel from the given candidate line component. FIG. 6c shows the region 600 with only the candidate line component 615 with lowest error.

Analogously, if the region 600 has a second predefined width characteristic and a second predefined height characteristic, wherein the width is greater than the height, the method comprises determining an error corresponding to each of a predefined number of candidate line components through the region 600, wherein end points of each candidate line component lie at predefined positions associated with the left-hand edge and right-hand edge of the region 600. The method then comprises identifying as the best-fit line component the candidate line component with lowest corresponding error.

If the region 600 does not have the first predefined width and height characteristics, and does not have the second predefined width and height characteristics, the method comprises determining the best-fit line component based on a regression analysis of the contiguous region.

In some examples, the number of predefined positions depends on the lesser of the height and width of the contiguous region. For example, the number of predefined positions may be equal to the lesser of the number of pixels corresponding to the height of the region 600 and the number of pixels corresponding to the width of the region 600. This is shown in FIG. 6b, in which the region 600 has a width of three pixels and wherein three predefined positions are associated with the top and bottom of the region 600.

The method may then comprise identifying the line in the image as comprising the line component 615. For example, this may comprise identifying connected line components as forming a single line in the image, for example by way of a Hough transform.

The present method allows detection of lines which may not have been detected without taking into account candidate line break regions as described above. For example, where enhanced bitmaps of gradient characteristics are generated, as described above, processing of the enhanced bitmaps allows detection of lines that would not have been detected via processing of the original bitmaps.

Figure 7:
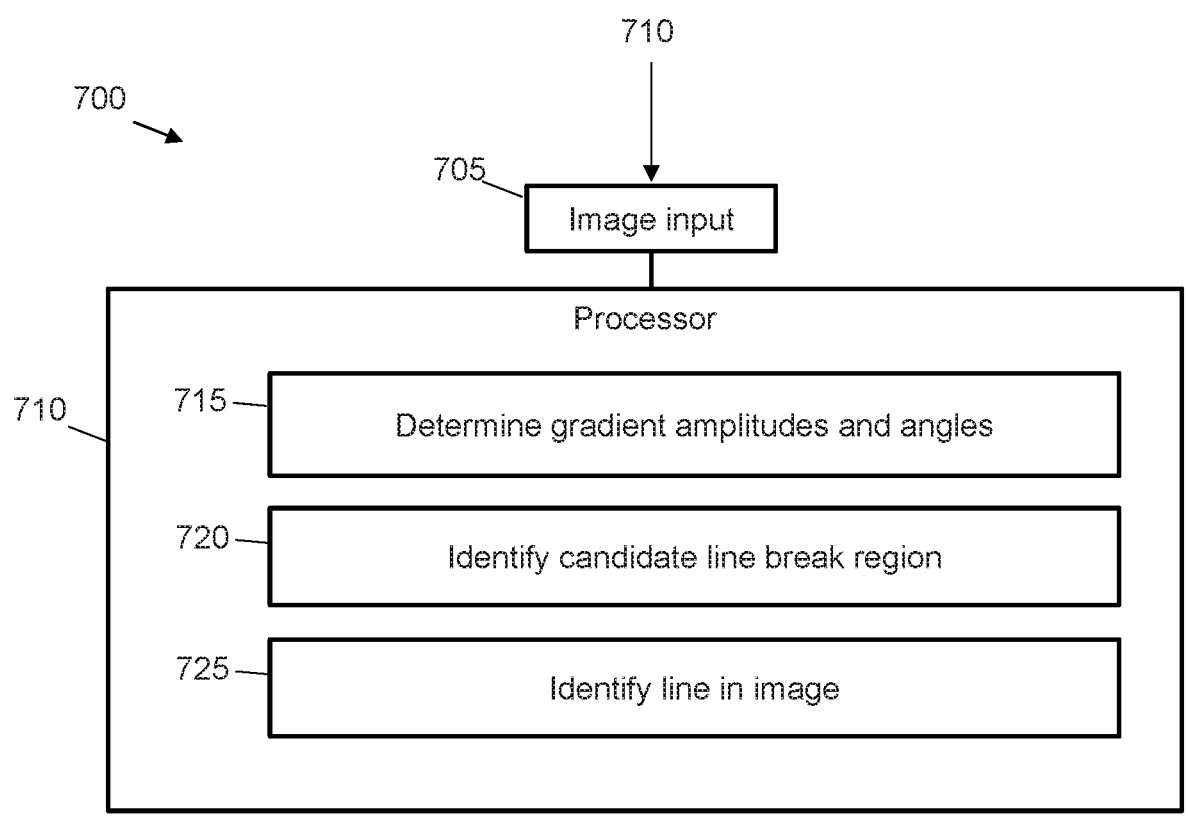
FIG. 7 shows a schematic representation of an apparatus according to an embodiment.

FIG. 7 shows an apparatus 700 for detecting a line in an image according to an example. The apparatus 700 comprises an input 705 configured to receive an image 710. The apparatus 700 further comprises a processor 710. The processor could for example be a central processing unit or a graphics processing unit. The apparatus may include other elements, such as camera optics and related hardware, a memory for storing images, and/or an output interface to output images and/or data representing detected lines. The apparatus may form part of a camera.

The processor 700 is configured to determine 715 a gradient amplitude and a gradient angle for each of a plurality of pixels of the image, for example as described above.

The processor 700 is then configured to identify 720 a candidate line break region in the image. Identifying the candidate line break region comprises identifying a first pixel of the plurality and a second pixel of the plurality, between which the candidate line break region appears. The first pixel has a first quantised gradient angle and the second pixel has a second quantised gradient equal to the first gradient angle, the first pixel and second pixel each have a predefined gradient amplitude characteristic, and the pixel or pixels of the candidate line break region do not have the predefined amplitude characteristic.

The processor is then configured to, at 725, identify a line in the image, wherein the line passes through the candidate line break region.

Figure 8:
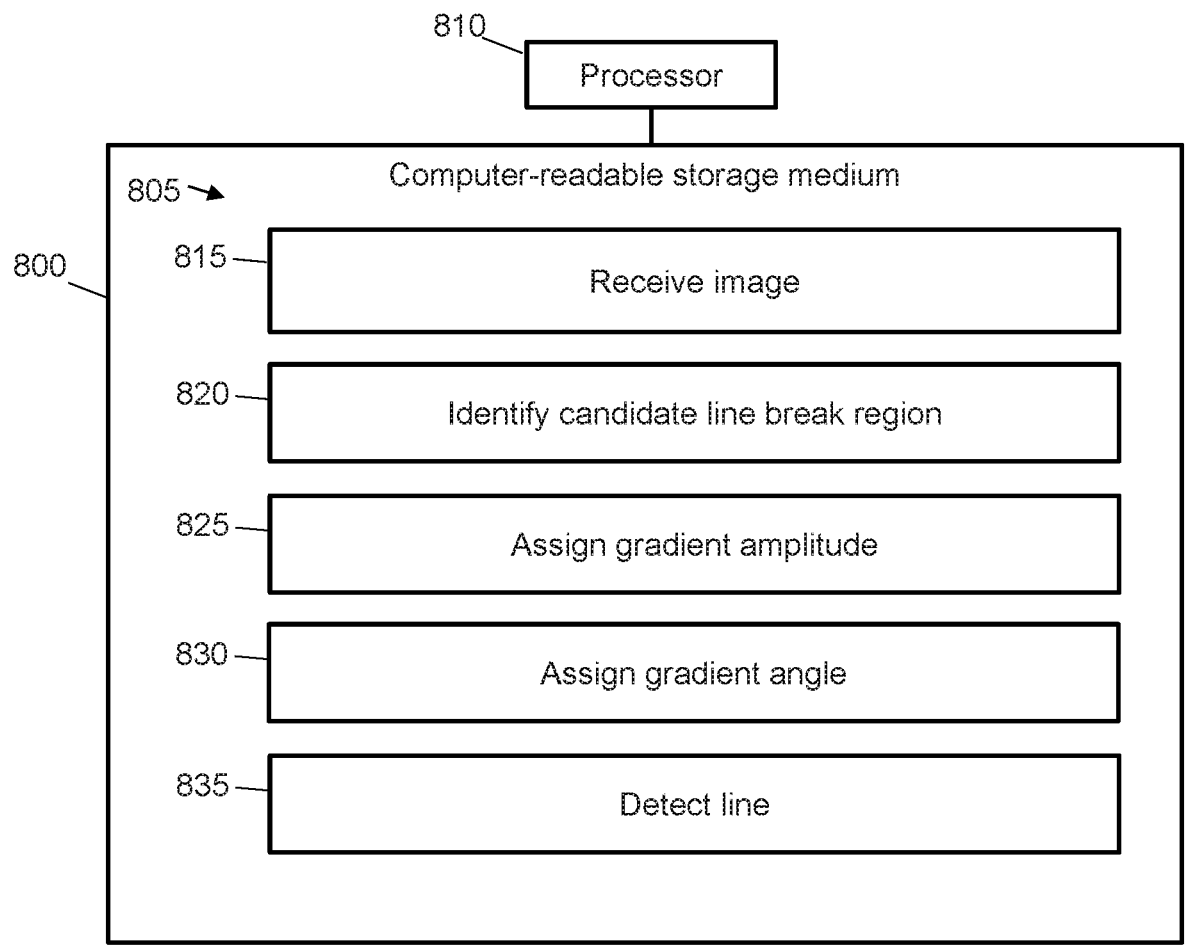
FIG. 8 shows a schematic representation of a non-transitory computer-readable storage medium according to an embodiment.

FIG. 8 shows an example of a non-transitory computer-readable storage medium 800 comprising a set of computer readable instructions 805 which, when executed by at least one processor 810, cause the at least one processor 810 to perform a method according to examples described herein. The computer readable instructions 805 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read only memory (ROM), an erasable programmable read-only memory, or a portable disc.

At block 815, the instructions 805 cause the processor 810 to receive from an input an image.

At block 820, the instructions 805 cause the processor 810 to identify a candidate line break region in the image, wherein identifying the candidate line break region comprises identifying a first pixel of the image and a second pixel of the image, between which the line break candidate appears. The first pixel has a first gradient angle and the second pixel has a second gradient angle with a predetermined relationship to the first gradient angle.

At block 825, the instructions 805 cause the processor 810 to assign to each pixel of the candidate line break region a gradient amplitude based on at least one of a gradient amplitude of the first pixel and a gradient amplitude of the second pixel.

At block 830, the instructions 805 cause the processor 810 to assign to each pixel of the candidate line break region a gradient angle based on at least one of the first gradient angle and the second gradient angle.

At block 835, the instructions 805 cause the processor 810 to, based on the assigned gradient angle and assigned gradient amplitude, detect a line in the image.

The above embodiments are to be understood as illustrative examples of the invention. Alternatives are envisaged. For example, instead of amending a bitmap of gradient characteristics to produce an enhanced bitmap as described above, candidate line break regions may be stored separately and retrieved when detecting lines in the image. As another alternative, the apparatus shown in FIG. 7 may not form part of a camera but may instead be a remote processing device configured to receive images over a network. Information defining a line or lines detected in the image may be stored in metadata associated with the image. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for detecting a line in an image, the method comprising:
    identifying a candidate line break region in the image, wherein identifying the candidate line break region comprises identifying a first pixel of the image and a second pixel of the image, between which the candidate line break region appears, a characteristic of the first pixel and the second pixel having a predetermined similarity relationship;
    assigning to a pixel of the candidate line break region a gradient amplitude based on at least one of a gradient amplitude of the first pixel and a gradient amplitude of the second pixel; and
    assigning to a pixel of the candidate line break region a gradient angle based on at least one of a gradient angle of the first pixel and a gradient angle of the second pixel; and
    using the identified candidate line break region to assist in detecting a line in the image,
    wherein the detecting of the line in the image is based on the assigned gradient amplitude and the assigned gradient angle.

2. A method according to claim 1, wherein the characteristic is gradient angle.

3. A method according to claim 1, wherein the candidate line break region comprises a pixel with a predetermined difference relationship to the first and second pixels.

4. A method according to claim 3, wherein the predetermined difference relationship of the pixel of the candidate line break region to the first and second pixels is such that the pixel of the candidate line break region has a gradient amplitude lower than a gradient amplitude of the first pixel and lower than a gradient amplitude of the second pixel.

5. A method according to claim 3, wherein the predetermined difference relationship of the pixel of the candidate line break region to the first and second pixels is such that the pixel of the candidate line break region has a gradient angle different from a gradient angle of the first pixel and different from a gradient angle of the second pixel.

6. A method according to claim 1, wherein the predetermined similarity relationship is such that the characteristic of the second pixel is within a predefined range of the characteristic of the first pixel.

7. A method according to claim 1, comprising identifying that the candidate line break region has a predetermined size characteristic.

8. A method according to claim 1, comprising filtering a gradient amplitude of at least one pixel, wherein the filtering comprises determining whether adjacent pixels have a predefined gradient amplitude relationship.

9. A method according to claim 1, comprising identifying a line component in the image, wherein identifying the line component comprises:
    identifying a contiguous region comprising a plurality of pixels and corresponding to the line component; and
    determining a best-fit line component through the contiguous region, wherein:
        the pixels of the plurality have a predetermined gradient amplitude characteristic;
        the pixels of the plurality have a predetermined gradient angle characteristic; and
        the contiguous region has a predetermined size characteristic.

10. A method according to claim 9, where determining the best-fit line component comprises:
   if the contiguous region has a first predefined width characteristic and a first predefined height characteristic, wherein the height is greater than the width:
      determining an error corresponding to each of a predetermined number of candidate line components through the contiguous region, wherein end points of each candidate line component lie at predefined positions associated with the top edge and bottom edge of the contiguous region; and
      identifying as the best-fit line component the candidate line component with lowest corresponding error;
   if the contiguous region has a second predefined width characteristic and a second predefined height characteristic, wherein the width is greater than the height:
      determining an error corresponding to each of a predefined number of candidate line components through the contiguous region, wherein end points of each candidate line component lie at predefined positions associated with the left-hand edge and right-hand edge of the contiguous region; and
      identifying as the best-fit line component the candidate line component with lowest corresponding error; and
   if the first contiguous region does not have the first predefined width characteristic and first predefined height characteristic, and does not have the second predefined width characteristic and second predefined height characteristic:
      determining the best-fit line component based on a regression analysis of the contiguous region.

11. A method according to claim 10, wherein the number of predefined positions depends on the lesser of the height and width of the contiguous region.

12. A method according to claim 9, comprising identifying the line in the image as comprising the line component.

13. An apparatus for detecting a line in an image, the apparatus comprising:
   an input configured to receive an image;
   a processor configured to:
      determine a gradient amplitude and a gradient angle for each of a plurality of pixels of the image;
         identify a candidate line break region in the image, wherein identifying the candidate line break region comprises identifying a first pixel of the plurality and a second pixel of the plurality, between which the candidate line break region appears;
      assign to a pixel of the candidate line break region a gradient amplitude based on at least one of a gradient amplitude of the first pixel and a gradient amplitude of the second pixel; and
      assign to a pixel of the candidate line break region a gradient angle based on at least one of a gradient angle of the first pixel and a gradient angle of the second pixel; and
      identify a line in the image, based on the assigned gradient amplitude and the assigned gradient angle, wherein the line passes through the candidate line break region.

14. A non-transitory computer-readable storage medium comprising a set of computer-readable instructions stored thereon which, when executed by at least one processor, cause the at least one processor to:
   receive from an input an image;
   identify a candidate line break region in the image, wherein identifying the candidate line break region comprises identifying a first pixel of the image and a second pixel of the image, between which the line break candidate appears, wherein the first pixel has a first gradient angle and the second pixel has a second gradient angle with a predetermined relationship to the first gradient angle;
   assign to each pixel of the candidate line break region a gradient amplitude based on at least one of a gradient amplitude of the first pixel and a gradient amplitude of the second pixel;
   assign to each pixel of the candidate line break region a gradient angle based on at least one of the first gradient angle and the second gradient angle; and
   based on the assigned gradient angle and assigned gradient amplitude, detect a line in the image.

15. An apparatus according to claim 13, wherein:
the first pixel has a first quantised gradient angle and the second pixel has a second quantised gradient equal to the first gradient angle;
the first pixel and second pixel each have a predefined gradient amplitude characteristic; and
the pixel or pixels of the candidate line break region do not have the predefined amplitude characteristic.

* * * * *